US007075021B2

(12) United States Patent
Rowe et al.

(10) Patent No.: US 7,075,021 B2
(45) Date of Patent: Jul. 11, 2006

(54) MULTIPLE-HOLE TERMINAL LUG, BUSSING ASSEMBLY AND ELECTRICAL SWITCHING APPARATUS INCLUDING THE SAME

(75) Inventors: Neal E. Rowe, Asheville, NC (US); Michael H. Abrahamsen, Hendersonville, NC (US); Stanley E. Moore, Weaverville, NC (US); Timothy Fair, Bioling Springs, SC (US); Marlyce J. Scott, Hendersonville, NC (US)

(73) Assignee: Eaton Corporation, Cleveland, OH (US)

( * ) Notice: Subject to any disclaimer, the term of this patent is extended or adjusted under 35 U.S.C. 154(b) by 214 days.

(21) Appl. No.: 10/876,880

(22) Filed: Jun. 25, 2004

(65) Prior Publication Data

US 2005/0284739 A1 Dec. 29, 2005

(51) Int. Cl.
*H02G 5/00* (2006.01)

(52) U.S. Cl. ............................... 200/50.21; 200/50.24; 200/50.27; 174/68.2; 361/640; 361/648; 361/608; 439/213

(58) Field of Classification Search ............. 200/50.21, 200/50.24, 50.27, 400, 284, 297, 303–307; 174/68.2, 68.3; 439/212–213; 361/605–617, 361/624, 627, 637–641, 644, 652, 648–650, 361/655, 656, 675

See application file for complete search history.

(56) References Cited

U.S. PATENT DOCUMENTS

| | | | | |
|---|---|---|---|---|
| 2,279,905 | A * | 4/1942 | Murphy | 200/284 |
| 4,205,207 | A * | 5/1980 | Clausing | 200/50.24 |
| 4,413,306 | A * | 11/1983 | Erickson | 361/648 |
| 5,053,918 | A * | 10/1991 | Norden | 361/640 |
| 5,530,205 | A * | 6/1996 | Parks et al. | 361/640 |
| 6,111,745 | A | 8/2000 | Wilkie, II et al. | |
| 6,410,844 | B1 | 6/2002 | Bruner et al. | |
| 6,424,519 | B1 * | 7/2002 | Soares et al. | 361/608 |
| 6,786,749 | B1 * | 9/2004 | Meiners et al. | 439/213 |
| 6,888,066 | B1 * | 5/2005 | Wiant et al. | 361/648 |

* cited by examiner

*Primary Examiner*—Michael A. Friedhofer
(74) *Attorney, Agent, or Firm*—Martin J. Moran

(57) ABSTRACT

A multiple-hole terminal lug is for a circuit breaker including a load terminal and a conductive terminal extension coupled thereto. The multiple-hole terminal lug includes a mounting portion and a receiving portion having a plurality of receptacles for electrically coupling a corresponding plurality of electrical cables to the load terminal. Secondary mounting holes in the mounting portion align with primary mounting holes in the terminal extension in order to receive fasteners therein and secure the multiple-hole terminal lug in a first or second mounting configuration sloping upward or downward with respect tot the longitudinal axis of the terminal extension.

20 Claims, 5 Drawing Sheets

MULTIPLE-HOLE TERMINAL LUG, BUSSING ASSEMBLY AND ELECTRICAL SWITCHING APPARATUS INCLUDING THE SAME

BACKGROUND OF THE INVENTION

1. Field of the Invention

The present invention relates generally to electrical switching apparatus and, more particularly, to terminations, such as terminals, for a circuit breaker.

2. Background Information

Electrical switching apparatus include, for example, circuit switching devices and circuit interrupters such as circuit breakers, contactors, motor starters, motor controllers and other load controllers.

Low voltage circuit breakers, for example, which are used in power distribution systems, are commonly mounted, either alone or in combination with additional switchgear, within a housing (e.g., without limitation, a load center). Frequently, the load side of the circuit breaker and the terminals thereof are disposed in the back of such housing thus providing very little space for accessing the circuit breaker load terminals. This makes attaching electrical cables, for example, to the load terminals difficult. Adding to this difficulty, certain electrical regulations impose minimum wire or cable spacing and bending requirements.

Certain ANSI regulations govern what cable landing configurations and current loads are permitted at the load terminals of a circuit breaker based on the particular type of cable being used. For example, for 500 Thousand Circular Mils (MCM) copper cable with 75° C. insulation in conduit, the maximum allowable load per cable is 385 A. Accordingly, for a 400 A application, for example, it is necessary to provide two cable terminals, and three terminals are provided for an 800 A application. There is, however, one exception in the National Electrical Code which permits 500 MCM cable to be upgraded from a 385 A load rating to 400 A for loads of 800 A and below. Therefore, when specified by a customer, one cable may be used for a 400 A application and two cables for an 800 A application.

In view of the foregoing, there is a well known, longstanding difficulty in the electrical switching apparatus art with regard to being able to provide desired or required electrical connections within confined spaces. For example, because the load terminals of certain circuit breakers typically extend substantially perpendicularly from the back of the circuit breaker, any electrical cables, for example, connected to such terminals, require a minimal amount of bending space between the terminal and the back of the enclosure (e.g., load center) in which the circuit breaker is installed. In order to address these considerations, known circuit breaker devices for minimizing cable spacing include a variety of bussing assemblies.

FIG. 1 illustrates the load side 2 of a low voltage circuit breaker 4 employing a bussing assembly 6. As shown, the bussing assembly 6 includes load terminal extensions, which are commonly referred to as runbacks 8. A separate vertical adapter or riser 10 made of a conductive material (e.g., without limitation, copper) and including a plurality of holes 12, is attached to each of the runbacks 8 in order to allow several standard, one-cable terminal lugs 14 to be mounted thereto. The one-cable terminal lugs 14 are mounted at an angle (i.e., sloping either upward or downward with respect to FIG. 1) based upon the desired cable entry (i.e. top or bottom) configuration (e.g., terminal lugs 14 are mounted sloping downward for cable entry from the bottom of FIG. 1). The multiple mounting locations on the risers 10 permit a plurality of cables (not shown) to be electrically connected to each terminal and also permits the standard terminal lugs 14 to be sloped, thereby reducing the amount of cable bending, and thus space, required for the cables (not shown). However, such a design is limited by the number of standard one-cable lugs 14 that can be mounted upon the risers 10 (e.g., four lugs 14 are mounted on each riser 10 in FIG. 1). Efficiency of the design is further reduced by the limitations imposed by the aforementioned applicable electrical codes and regulations.

There is, therefore, room for improvement in the art of terminal lugs for electrical switching apparatus. There is also room for improvement in electrical switching apparatus employing such terminal lugs.

SUMMARY OF THE INVENTION

These needs, and others, are met by the present invention which provides a multiple-hole terminal lug for electrical switching apparatus. The terminal lug couples directly to a terminal extension or runback, thereby eliminating the need for a separate riser adapter. The terminal lug may include a plurality of receptacles for receiving a corresponding plurality of electrical connection mechanisms (e.g., without limitation, cables; wires) and also has the ability to be electrically coupled to the runback in a variety of orientations (i.e., sloped upward or downward) thus increasing the number of electrical cables and thus the load which may be employed while reducing the amount of space required therefor.

As one aspect of the invention, a multiple-hole terminal lug is for an electrical switching apparatus including at least one load terminal with a conductive terminal extension coupled thereto, the terminal extension forming a number of first mounting holes. The multiple-hole terminal lug comprises: a mounting portion structured to be electrically coupled to the terminal extension in one of a plurality of predetermined mounting configurations, the mounting portion including a number of second mounting holes, wherein one or more of the second mounting holes is structured to align with one or more of the first mounting holes of the terminal extension in order to receive at least one first fastener therethrough; a receiving portion including a plurality of receptacles adapted to receive a corresponding plurality of electrical connection mechanisms therein; and a plurality of second fasteners, wherein one of the second fasteners is structured to electrically couple one of the corresponding plurality of electrical connection mechanisms within a corresponding one of the plurality of receptacles, in order that the corresponding plurality of electrical connection mechanisms are in electrical communication with the mounting portion when disposed within the plurality of receptacles.

As another aspect of the invention, a bussing assembly is for an electrical switching apparatus including a load terminal. The bussing assembly comprises: at least one first fastener; a conductive terminal extension adapted to be coupled to the load terminal, the terminal extension including a number of first mounting holes; and a multiple-hole terminal lug electrically coupled to the conductive terminal extension, the multiple-hole terminal lug comprising: a mounting portion coupled to the terminal extension in one of a plurality of predetermined mounting configurations, the mounting portion including a number of second mounting holes wherein one or more of the second mounting holes aligns with one or more of the first mounting holes of the terminal extension in order to receive the at least one first fastener therethrough, a receiving portion including a plurality of receptacles which receive a corresponding plurality of electrical connection mechanisms therein; and a plurality of second fasteners structured to electrically couple the corresponding plurality of electrical connection mechanisms within the plurality of receptacles, in order that the corresponding plurality of electrical connection mechanisms are in electrical communication with the terminal extension when disposed within the plurality of receptacles.

The terminal extension may include a longitudinal axis and the plurality of predetermined mounting configurations may include first and second mounting configurations wherein the multiple-hole terminal lug and the plurality of receptacles therein slope upward from the longitudinal axis in order to receive the corresponding plurality of electrical connection mechanisms at a first angle with respect to the longitudinal axis when disposed in the first mounting configuration and the terminal lug and the plurality of receptacles therein slope downward from the longitudinal axis in order to receive the corresponding plurality of electrical connection mechanisms at a second angle with respect to the longitudinal axis when disposed in the second mounting configuration.

The first mounting holes in the terminal extension may include two or more primary mounting holes, the second mounting holes in the mounting portion may include three or more secondary mounting holes and the at least one first fastener may include two or more first fasteners wherein at least two of the three or more secondary mounting holes in the mounting portion align with at least two of the two or more primary mounting holes in the terminal extension in order to receive the two or more first fasteners therein thereby securing the multiple-hole terminal lug in one of the first and second mounting configurations.

As another aspect of the invention an electrical switching apparatus comprises: separable contacts; an operating mechanism for opening and closing the separable contacts; a conductive load terminal; a bussing assembly including a conductive terminal extension coupled to the load terminal, the terminal extension forming a number of first mounting holes; and a multiple-hole terminal lug electrically coupled to the terminal extension, the multiple-hole terminal lug comprising: a mounting portion coupled to the terminal extension in one of a plurality of predetermined mounting configurations, the mounting portion forming a number of second mounting holes wherein one or more of the number of second mounting holes aligns with one or more of the number of first mounting holes of the terminal extension in order to receive at least one first fastener therethrough, a receiving portion forming a plurality of receptacles for receiving a corresponding plurality of electrical connection mechanisms therein; and a plurality of second fasteners for electrically coupling one of the corresponding plurality of electrical connection mechanisms within the plurality of receptacles, in order that the corresponding plurality of electrical connection mechanisms are in electrical communication with the load terminal when disposed within the plurality of receptacles.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
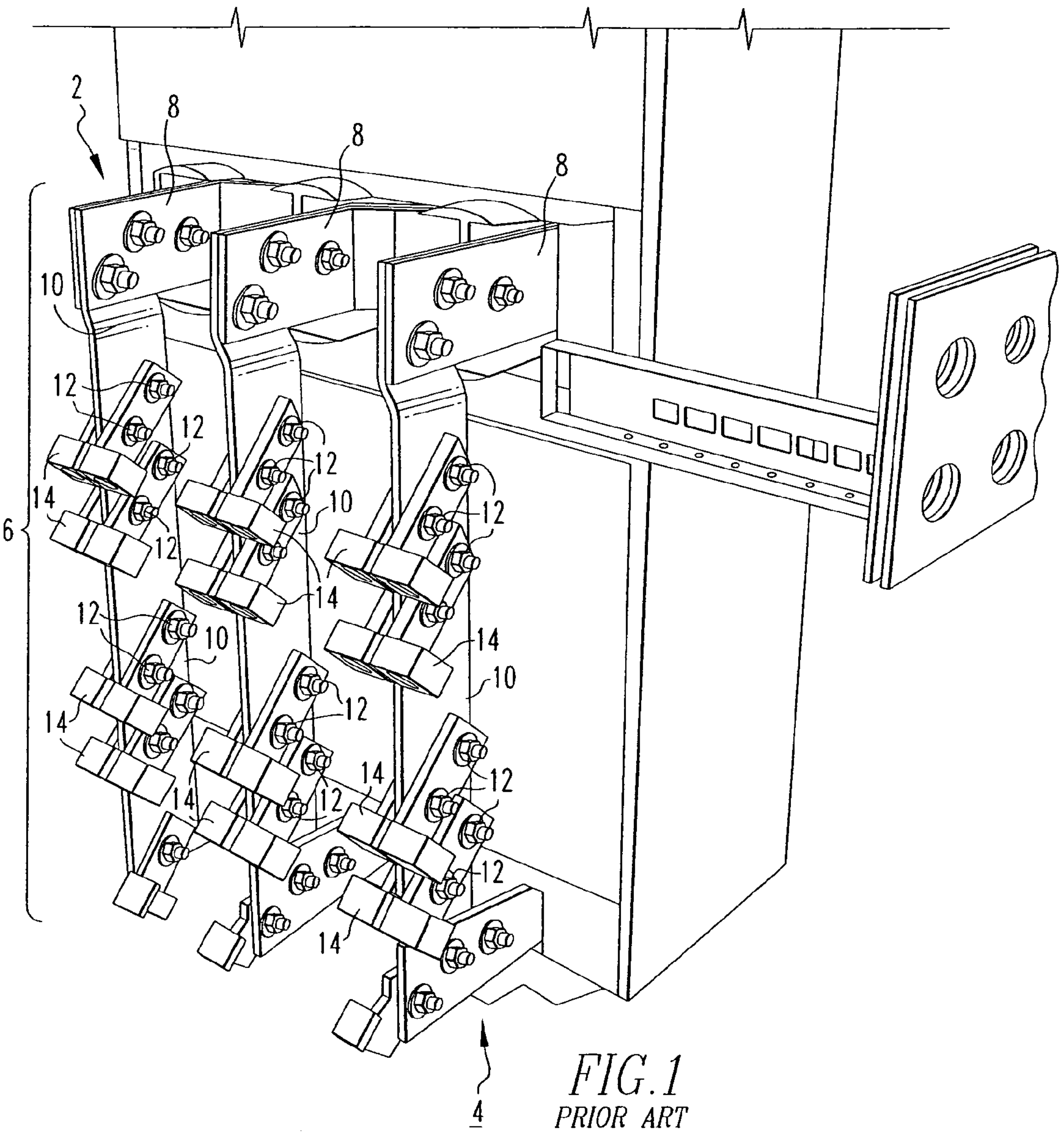
FIG.1 PRIOR ART
FIG. 1 is an isometric view of a bussing assembly for the load side of a low voltage circuit breaker.

For purposes of illustration, the invention will be described as applied to terminal lugs for receiving a plurality of cables at the terminations (e.g., load terminals) of a low voltage circuit breaker, although it will become apparent that it could also be applied to other types of circuit breakers and to other types of electrical switching apparatus (e.g., without limitation, circuit switching devices and other circuit interrupters such as contactors, motor starters, motor controllers and other load controllers having one or more line or load terminals). It will also be appreciated that, for ease of illustration, the invention is described and illustrated herein as employed on one terminal of one pole of a low voltage circuit breaker. However, the invention is also for terminals of circuit breakers having any number of poles (i.e., multi-pole circuit breakers).

Directional phrases used herein, such as, for example, upper, lower, front, back and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws (e.g., without limitation, set screws also known as Allen screws), bolts and the combinations of bolts and nuts, and bolts, washers and nuts.

As employed herein, the term "low voltage circuit breaker" refers to a circuit breaker that generally operates at a voltage rating of less than about 600 volts.

As employed herein, the statement that two or more parts are "coupled" together shall mean that the parts are joined together either directly or joined through one or more intermediate parts.

As employed herein, the term "number" shall mean one or more than one (i.e., a plurality).

As employed herein, the term "electrical connection mechanism" refers to any suitable electrically conductive mechanism expressly including, but not limited to, wires and cables.

Unless expressly stated otherwise, for purposes of the present invention, it will be appreciated that the load side components of the circuit breaker, bussing assembly and multiple-hole terminal lug are in electrical communication with one another. For example, the terminal extension or runback is electrically coupled to the load terminal of the circuit breaker, the multiple-hole terminal lug is electrically coupled to the runback and the fasteners for the electrical connection mechanisms (e.g., without limitation, wires; cables) are electrically coupled within the receptacles of the multiple-hole terminal lug. Accordingly, all components of the bussing assembly are in electrical communication such that electricity may flow between the various components.

Figure 8A:
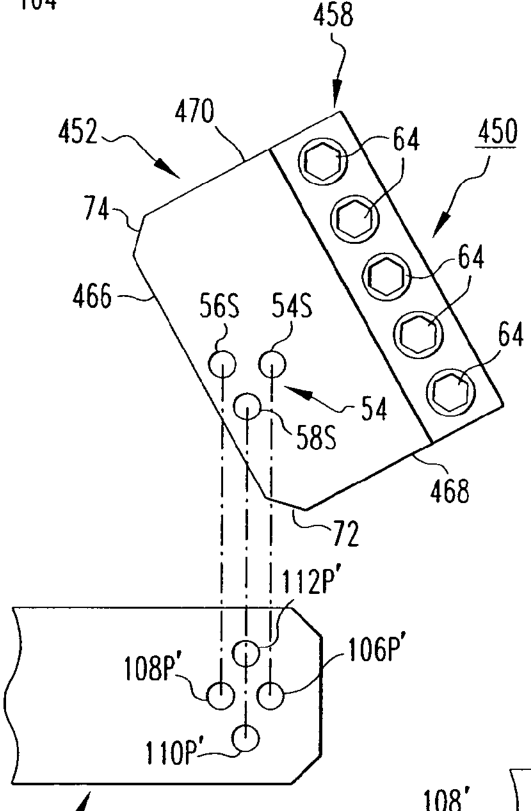
FIG. 8A is an exploded isometric view of a terminal extension and multiple-hole lug assembly in accordance with another embodiment of the invention.
Figure 8B:
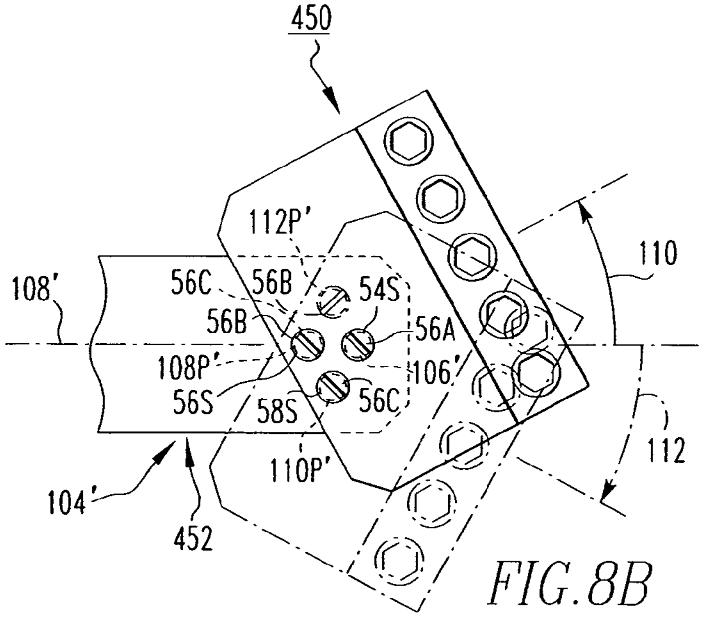
FIG. 8B is an isometric view of the assembly of FIG. 8A including three fasteners as employed to couple the multiple-hole terminal lug to the terminal extension in a first configuration, with a second mounting configuration shown in phantom line drawing.
Figure 9:
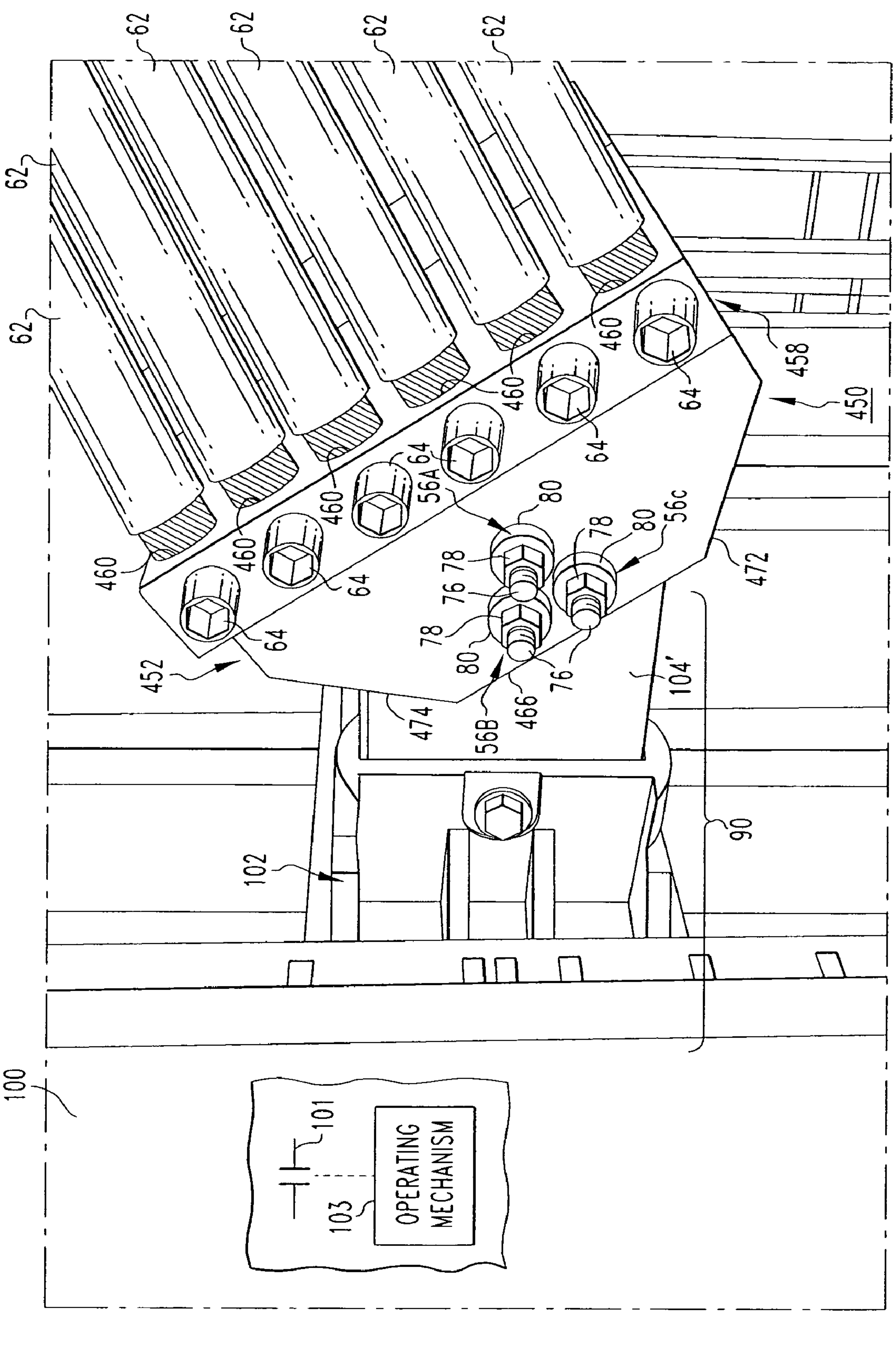
FIG. 9 is an isometric view of the assembly of FIG. 8B as employed on a terminal extension for a circuit breaker load terminal, with six electrical cables disposed within the six receptacles of the multiple-hole terminal lug and with a portion of the circuit breaker housing cut away to show internal structures.

FIGS. 2–6 show alternative embodiments of a multiple-hole terminal lug for an electrical switching apparatus, such as, for example, the low voltage circuit breaker 100 of FIG. 9. Each of the multiple-hole terminal lug embodiments includes a mounting portion 52 structured to be electrically coupled to a conductive terminal extension (e.g., 104 of FIGS. 7A–7B; 104' of FIGS. 8A, 8B and 9), which is coupled to a load terminal 102 (FIG. 9) of the circuit breaker 100 (FIG. 9). The terminal lugs are mounted on the terminal in one of a plurality of predetermined mounting configurations (see, e.g., FIGS. 7A–9), thereby providing a single attachment mechanism for accommodating multiple electrical connection mechanisms (e.g., wires; cables) within, for example, a confined space (e.g., within the back of a panelboard or switchgear cabinet (not shown)).

The mounting portion 52 of the multiple-hole terminal lugs 50, 150, 250, 350, 450 of FIGS. 2–6, respectively, include a number of second mounting holes 54, one or more of which is structured to align with one or more first mounting holes 106 (see, e.g., FIG. 7A) of the terminal extension (see, e.g., 104 (FIG. 7A)) in order to receive at least one first fastener (see, e.g., 56 (FIG. 7B)) therethrough. The exemplary mounting portion 52 includes three mounting holes 54, as shown. However, it will be appreciated that any suitable number of mounting holes (not shown) in any suitable configuration (not shown) other than the arrangement of the exemplary three mounting holes 54 of FIGS. 2–6, could alternatively be employed.

Figure 2:
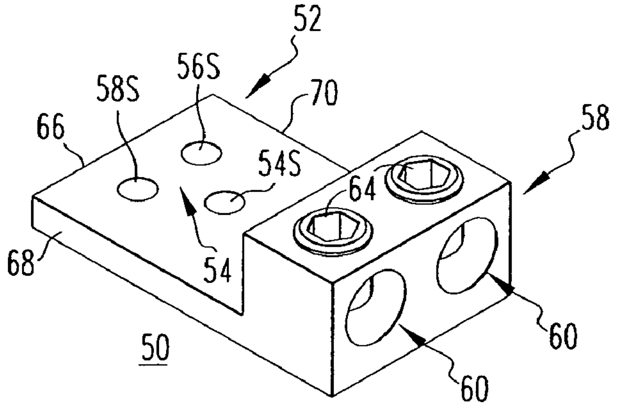
FIGS. 2–6 are isometric views of multiple-hole terminal lugs in accordance with embodiments of the invention.

Referring to FIG. 2, the multiple-hole terminal lug is a two-receptacle terminal lug 50. The terminal lug 50 includes a receiving portion 58 opposite the mounting portion 52. The receiving portion 58 includes a plurality of receptacles 60 adapted to receive a corresponding plurality of electrical connection mechanisms, such as the exemplary electrical cables 62 (FIGS. 7B and 9). The exemplary electrical cables 62 are in electrical communication with the mounting portion 52 when securely disposed within the exemplary receptacles 60. The two receptacles 60 receive a corresponding pair of such electrical cables (not shown in FIG. 2). The receiving portion 58 further includes a plurality of second fasteners 64 each of which is structured to electrically couple one of the electrical cables 62 within a corresponding one of the receptacles 60. Accordingly, for example, the two-receptacle terminal lug 50 includes a pair of second fasteners, such as the exemplary set screws 64 shown. Each of the set screws 64 electrically couples a corresponding one of the electrical cables 62 within the corresponding one of the receptacles 60, when the set screw 64 is tightened. It will be appreciated that any known or suitable alternative fastener (not shown) or fastening mechanism (not shown) other than the set screws 64 could be employed to electrically connect the electrical connection mechanisms (e.g., electrical cables 62) to the mounting portion 52.

Figure 3:
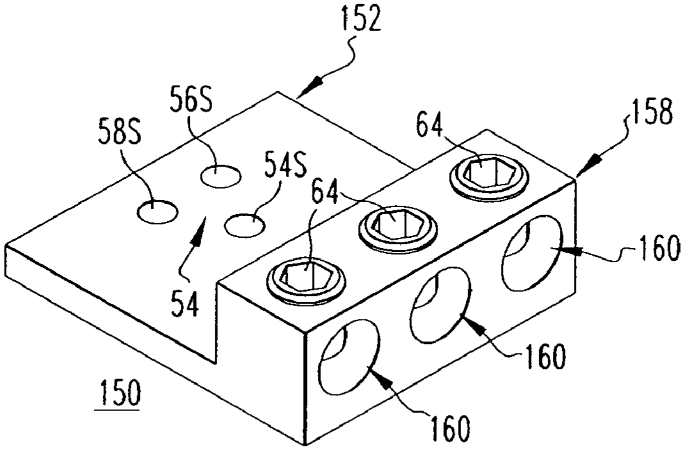

FIG. 3 shows a multiple-hole terminal lug which is a three-receptacle terminal lug 150. As will be discussed in detail, below, the three-receptacle terminal lug 150 is essentially the same as the two-receptacle terminal lug 50 previously discussed in connection with FIG. 2; however, the terminal lug 150 includes a receiving portion 158 having three receptacles 160 and three second fasteners (e.g., set screws 64) for securing three electrical cables 62 (not shown in FIG. 3) therein. As shown, the mounting portion 152 of the three-receptacle terminal lug 150 remains essentially unchanged apart from its width, which is increased by an amount corresponding to the increased width of the receiving end 158, such increase being determined by the number of additional receptacles 160 therein (e.g., terminal lug 150 includes one additional receptacle 160 than the receptacles 60 of the two-receptacle terminal lug 50 in FIG. 2). Accordingly, it will be appreciated that the exemplary terminal lugs of the present invention may be made from, for example, an extrusion of material which can be made as a single extrusion and then cut to the desired terminal lug width. For example, the five-receptacle terminal lug 350 of FIG. 5, discussed below, had it not been subjected to the exemplary subsequent cutting operation to form first and second tapers 72, 74, consists essentially of an extrusion which could be cut to form the separable two-receptacle terminal lug 50 and three-receptacle terminal lug 150 of FIGS. 2 and 3, respectively. It will also be appreciated that the formation of the secondary mounting holes 54S, 56S, 58S, described below in connection with FIGS. 7A–9, is also a subsequent machining operation, which is performed after the extrusion is cut to the desired width.

Figure 4:
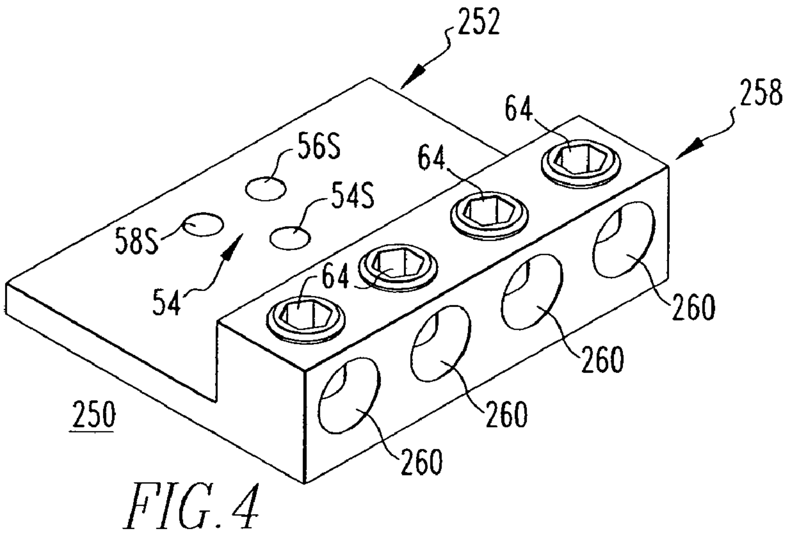

As shown in FIG. 4, another multiple-hole terminal lug embodiment includes a four-receptacle terminal lug 250 wherein the receiving portion 258 includes four receptacles 260 and four exemplary set screws 64 therefor. The set screws 64 are structured to electrically couple four electrical cables 62 (not shown in FIG. 4) to the mounting portion 252 when tightened. Therefore, as previously discussed, it will be appreciated that when secured by the set screws 64, the electrical cables 62 (FIGS. 7B and 9) are in electrical communication with the low voltage circuit breaker 100 (FIG. 9). This is true for all embodiments of the multiple-hole terminal lug (e.g., 50, 150, 250, 350, 450) of the present invention.

Figure 5:
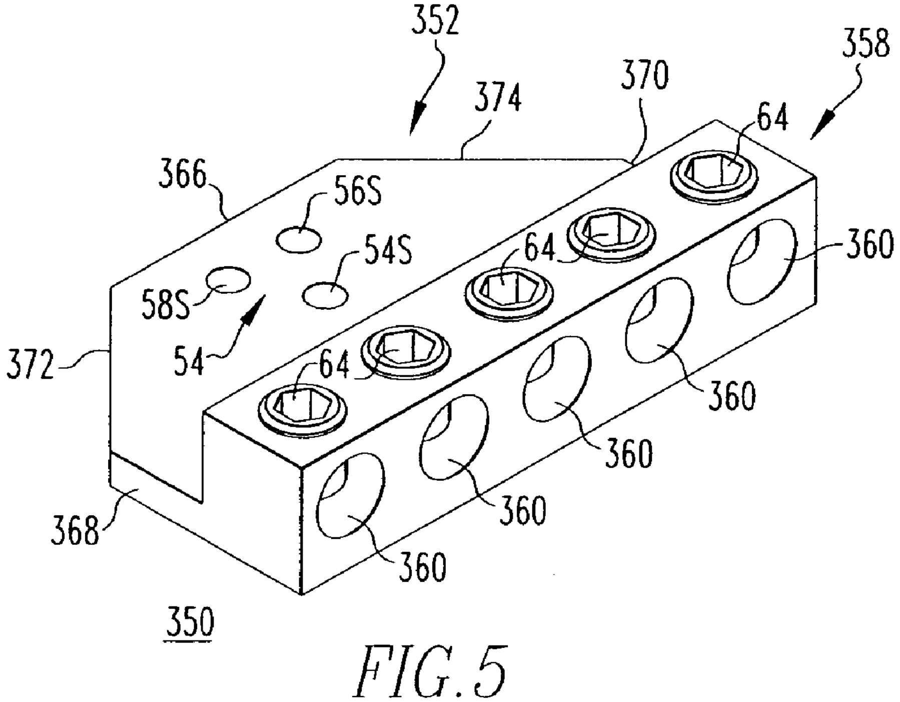

FIG. 5 shows a five-receptacle terminal lug 350 including five receptacles 360 and five exemplary set screws 64 at the receiving portion 358 thereof. The mounting portion 352 of the five-receptacle terminal lug 350, similar to the multiple-hole terminal lug embodiments 50, 150 and 250 of FIGS. 2, 3 and 4, respectively, includes first and second sides 368, 370 and an end 366. However, unlike the foregoing embodiments, as previously discussed, the five-receptacle terminal lug 350 includes first and second tapers 372, 374 extending between each of the first and second sides 368, 370 and the end 366, respectively. The first and second tapered portions 72, 74 eliminate the corners of the mounting portion 352 (see, e.g., the corner at the intersection of side 68 and end 66 of mounting portion 52 of FIG. 2), thus permitting the terminal lug (e.g., 350) to be mounted upon the terminal extension 104 (FIG. 7A), 104' (FIG. 8A) at an angle with respect to a longitudinal axis 108 (FIG. 7B), 108' (FIG. 8B) thereof without interfering with, for example, adjacent structures (as best shown in FIG. 9).

Figure 6:
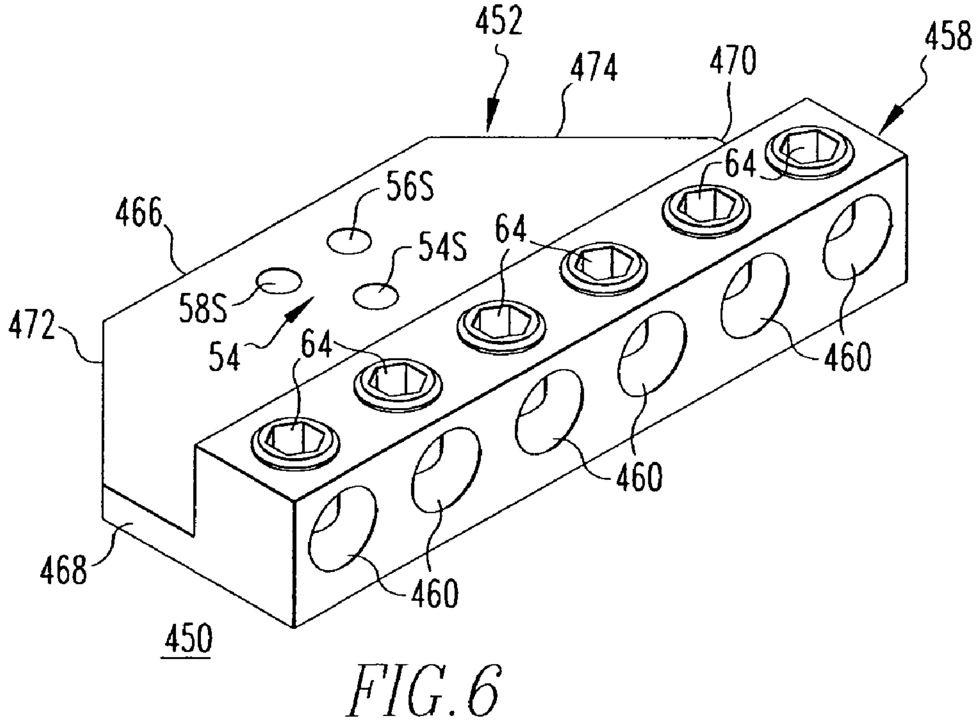

FIG. 6 shows a six-receptacle terminal lug 450 which is similar to the lug 350 of FIG. 5, but further includes an additional receptacle 460 and an additional set screw 64 at its receiving portion 458. Like the five-receptacle terminal lug 350 of FIG. 5, the mounting portion 452 of this embodiment also includes the first and second tapered portions 472, 474 between first and second sides 468, 470 and end 466, respectively, thereby permitting the lug 450 to be mounted at an angle (as best shown in FIGS. 8B and 9) without interfering with adjacent structures (e.g., bussing; the circuit breaker housing).

Accordingly, the two, three, four, five and six-receptacle terminal lugs 50, 150, 250, 350, 450 of FIGS. 2–6 provide a single conductive connection mechanism for two, three, four, five or six electrical cables 62, respectively. As previously discussed, in accordance with applicable electrical codes and regulations, two-receptacle terminal lugs 50 (FIG. 2) are used for 400 A applications, three-receptacle terminal lugs 150 (FIG. 3) are used for 800 A applications, four-receptacle terminal lugs 250 (FIG. 4) are used for 1,200 A applications, five-receptacle terminal lugs 350 (FIG. 5) are used for 1,600 A applications and six-receptacle terminal lugs 450 (FIG. 6) are used for 2,000 A applications. However, it will be appreciated that the multiple-hole terminal lugs 50, 150, 250, 350, 450 may include any known or suitable alternative number and configuration (not shown) of receptacles (e.g., 60, 160, 260, 360, 460) for a wide range of different current applications.

Figure 7A:
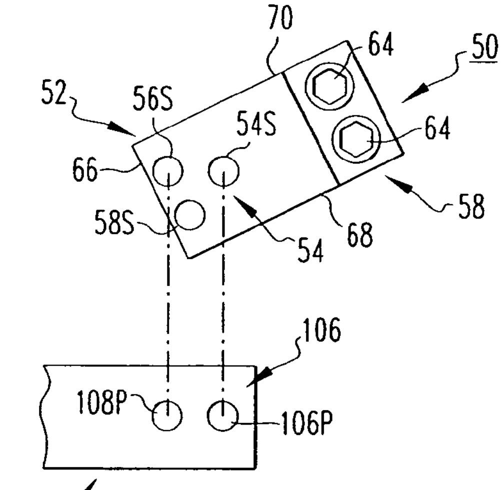
FIG. 7A is an exploded isometric view of a terminal extension and multiple-hole terminal lug assembly in accordance with another embodiment of the invention.
Figure 7B:
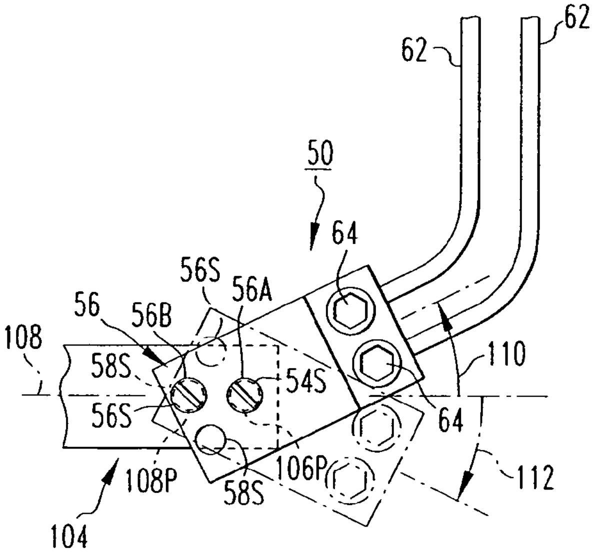
FIG. 7B is an isometric view of the assembly of FIG. 7A including two fasteners as employed to couple the multiple-hole terminal lug to the terminal extension in a first mounting configuration, with a second mounting configuration shown in phantom line drawing.

FIG. 7A shows portions of a bussing assembly 90 (FIG. 9) for the exemplary low voltage circuit breaker 100 (FIG. 9). The bussing assembly 90 includes at least one first fastener 56 (FIG. 7B), a conductive terminal extension 104, which is coupled to the load terminal 102 (FIG. 9) of the circuit breaker 100 (FIG. 9) and includes a number of first mounting holes 106, and the multiple-hole terminal lug (e.g., 50). As previously discussed, the mounting portion 52 of the multiple-hole terminal lug 50 includes a number of second mounting holes 54, such as the exemplary first, second and third secondary mounting holes 54S, 56S, 58S. The terminal extension 104 includes a number of first mounting holes 106, such as the exemplary first and second primary mounting holes 106P, 108P shown in FIG. 7A. As discussed below, a number of the secondary mounting holes 54S, 56S, 58S align with the primary mounting holes 106P, 108P in order to receive the fastener 56 (FIG. 7B) and secure the terminal lug 50 to the terminal extension 104.

Referring now to FIG. 7B, the multiple-hole terminal lug 50 is shown mounted on the terminal extension 104 in the exemplary first and second (shown in phantom line drawing) mounting configurations. As previously discussed, at least one, and preferably two or more, of the first, second and third secondary mounting holes 54S, 56S, 58S align with the first and second primary mounting holes 106P, 108P. The manner of alignment determines in which of the first and second mounting configurations the terminal lug 50 will be mounted.

For example, when mounted in the first mounting configuration, the multiple-hole terminal lug 50 and the receptacles 60 therein, slope upward from the longitudinal axis 108 of the terminal extension 104 in order to receive the electrical cables 62 at about a first angle 110 with respect to such axis 108. When disposed in the second mounting configuration (shown in FIG. 7B in phantom line drawing), the multiple hole terminal lug 50 and the receptacles 60 therein slope downward from the longitudinal axis 108 in order to receive the corresponding electrical cables 62 at a second angle 112 with respect to such axis 108. In this manner, the multiple-hole terminal lugs (e.g., 50) of the present invention provide connection mechanisms for connecting a plurality of, for example, electrical cables 62, to terminal extensions (e.g., 104) without requiring excessive space between the terminal extension (e.g., 104) and adjacent structures (e.g., without limitation, the back panel of a panel board or switchgear cabinet) (not shown). Specifically, by providing the first and second angles 110, 112 with respect to the longitudinal axis 108 (see also longitudinal axis 108' of FIG. 8B) of the terminal extension (e.g., 104), the multiple-hole terminal lug (e.g., 50) of the present invention also reduces the amount of electrical cable 62 bending required in order to provide electrical connections between the cable 62 and terminal extension (e.g., 104). For example, the two-receptacle terminal lug 50 of FIG. 7B, which is mounted in the first mounting configuration at first angle 110 with respect to longitudinal axis 108, positions the electrical cables 62 at such angle, thereby requiring less bending of the cables 62 than, for example, if they were coupled to the terminal extension substantially parallel (not shown) to the longitudinal axis 108. It will be appreciated that the measurement of the first and second angles 110, 112 is not meant to be a limiting aspect of the present invention; reference to such angles is made simply for ease of illustration. It will further be appreciated that such angles are dictated by the configuration of the mounting holes on the terminal extension (e.g., 104) and mounting portion 52 of the terminal lug 50.

Continuing to refer to FIG. 7B, a representative orientation of the primary and secondary mounting holes 106P, 108P; 54S, 56S, 58S and the pair of first and second fasteners 56A, 56B, which extend therethrough in order to secure the terminal lug 50 in one of the first and second mounting configurations, will now be discussed. When the multiple-hole terminal lug 50 is mounted in the first mounting configuration, as shown in FIG. 7B, one fastener 56A engages the first primary and secondary mounting holes 106P, 54S of the terminal extension 104 and the mounting portion 52, respectively, and the other fastener 56B engages the second primary and secondary mounting holes 108P, 56S in the terminal extension 104 and mounting portion 52, respectively. As shown in phantom line drawing in FIG. 7B, when the multiple-hole terminal lug 50 is mounted in the second mounting configuration, the one fastener 56A engages the first primary and secondary mounting holes 106P, 54S in the terminal extension 104 and the mounting portion 52, respectively, and the other fastener 56B engages the second primary mounting hole 108P in the terminal extension 104 and the third secondary mounting hole 58S in the mounting portion 52, respectively.

It will, however, will be appreciated that a wide range of alternative mounting hole and fastener configurations (not shown), other than those illustrated in the figures herein, could alternatively be employed. It will also be appreciated that, for ease of illustration, only the mounting of the two-receptacle terminal lug 50, previously discussed, and the six-receptacle terminal lug 450, discussed below, are discussed in detail. It will be appreciated that the multiple-hole terminal lug embodiments of FIGS. 3–5 and other terminal lug embodiments (not shown) are mounted in a substantially similar, if not identical, fashion or alternatively, are mounted in any suitable alternative configuration (not shown).

For example, although not required, it is one preferred practice of the present invention to employ the foregoing mounting hole and first fastener configuration, described above in connection with FIGS. 7A and 7B, when mounting the two, three, four or five-receptacle terminal lugs 50, 150, 250, 350 (FIGS. 2–5, respectively) and to employ the mounting hole and fastener configuration described below in connection with FIGS. 8A and 8B, when mounting the six-receptacle terminal lug 450 previously discussed in connection with FIG. 6.

FIGS. 8A and 8B illustrate the first and second mounting configurations of the six-receptacle terminal lug 450 on the terminal extension 104'. As shown in FIG. 8A, the two or more primary mounting holes of the terminal extension 104' include first, second, third and fourth primary mounting holes 106P', 108P', 110P', 112P'. The three or more secondary mounting holes 54 of the mounting portion 352, like the mounting portions of the aforementioned terminal lug embodiments, include first, second and third secondary mounting holes 54S, 56S, 58S.

As shown in FIG. 8B, in this embodiment, the two or more first fasteners securing the mounting portion 452 to the terminal extension 104' preferably includes three first fasteners 56A, 56B, 56C. When the multiple-hole terminal lug 450 is mounted in the first mounting configuration, in which it slopes upward from the longitudinal axis 108' of the terminal extension 104', one fastener 56A engages the first primary and secondary mounting holes 106P', 54S of the terminal extension 104' and the mounting portion 452, respectively, a second fastener 56B engages the second primary and secondary mounting holes 108P', 56S in the terminal extension 104' and the mounting portion 452, respectively, and a third fastener 56C engages the third primary and secondary mounting holes 110P', 58S of the terminal extension 104' and the mounting portion 452, respectively.

When the six-receptacle terminal lug 450 is mounted in the second mounting configuration, as shown in hidden line drawing in FIG. 8B, the first fastener 56A engages the first, primary and secondary mounting holes 106P', 54S in the terminal extension 104' and the mounting portion 452, respectively, the second fastener 56B engages the fourth primary mounting hole 112P' in the terminal extension 104' and the second secondary mounting hole 56S in the mounting portion 452, respectively, and the third fastener 56C engages the second primary mounting hole 108P' in the terminal extension 104' and the third secondary mounting hole 58S of the mounting portion 452. However, as previously discussed, it will be appreciated that any alternative, suitable mounting hole and fastening mechanism configuration (not shown) could alternatively be employed.

FIG. 9 shows the load side of the exemplary low voltage circuit breaker 100. The circuit breaker 100 includes separable contacts 101 which are open and closed by an operating mechanism 103 (shown in block diagram form for ease of illustration). The circuit breaker 100 further includes the load terminal 102, the bussing assembly 90 and the conductive terminal extension 104' coupled thereto. As shown, the multiple-hole terminal lug (e.g., 450) is electrically coupled to the terminal extension 104' by the first fasteners 56A, 56B, 56C. The six-receptacle terminal lug 450 is shown disposed in the first mounting configuration wherein the six electrical cables 62 are coupled within the six receptacles 460 and slope upward with respect to longitudinal axis 108' (FIG. 8B). As previously discussed, the six-receptacle terminal lug 450 is mounted to the terminal extension 104' with three first fasteners 56A, 56B, 56C rather than two fasteners (e.g., 56A, 56B) as employed in the embodiments of FIGS. 2–5.

The exemplary first fasteners 56A, 56B, 56C include a bolt 76, a nut 78 and a resilient washer 80, as shown. The exemplary resilient washer 80 is a Belleville-type washer, which is well known to be compressible, similar to a spring. By employing such a resilient washer (e.g., 80), the terminal lug (e.g., 450) may be securely fastened to the terminal extension (e.g., 104') while accommodating, for example, thermal expansion due to heat generated in the energized components of the bussing assembly 90. It will, however, be appreciated that any suitable alternative mechanism (not shown) for accommodating component movement, for example, caused by heat, could be employed rather than the exemplary Belleville-type washers 80.

It will also be appreciated that, while the exemplary multiple-hole terminal lugs are made from aluminum including a conductive coating (e.g., without limitation, tin) adhered thereto, any known or suitable alternative material, could be employed. Such material may be conductive by itself or may be subsequently coated with a conductive material such as the exemplary tin-plating, or any suitable alternative. Additionally, although the multiple-hole terminal lug has been discussed herein as being made from an extrusion, it will be appreciated that any known or suitable alternative manufacturing process may be employed (e.g., without limitation, machining bar stock and then cutting it to length).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A multiple-hole terminal lug for an electrical switching apparatus including at least one load terminal with a conductive terminal extension coupled thereto, said terminal extension forming a number of first mounting holes, said multiple-hole terminal lug comprising:

a mounting portion structured to be electrically coupled to said terminal extension in one of a plurality of predetermined mounting configurations, said mounting portion including a number of second mounting holes, wherein one or more of said second mounting holes is structured to align with one or more of said first mounting holes of said terminal extension in order to receive at least one first fastener therethrough;

a receiving portion including a plurality of receptacles adapted to receive a corresponding plurality of electrical connection mechanisms therein; and a plurality of second fasteners, wherein one of said second fasteners is structured to electrically couple one of said corresponding plurality of electrical connection mechanisms within a corresponding one of said plurality of receptacles in order that said corresponding plurality of electrical connection mechanisms are in electrical communication with said mounting portion.

2. The multiple-hole terminal lug of claim 1 wherein said electrical connection mechanisms are electrical cables; and wherein said receptacles of said receiving portion, said electrical cables and said second fasteners are selected from the group consisting of two, three and four of each of said receptacles, said electrical cables and said second fasteners.

3. The multiple-hole terminal lug of claim 2 wherein said mounting portion further includes an end and first and second sides.

4. The multiple-hole terminal lug of claim 1 wherein said electrical connection mechanisms are electrical cables; and wherein said receptacles of said receiving portion, said electrical cables and said second fasteners are selected from the group consisting of five and six of each of said receptacles, said electrical cables and said second fasteners.

5. The multiple-hole terminal lug of claim 4 wherein said mounting portion further includes an end, first and second sides and first and second tapered portions extending between each of said first and second sides and said end, respectively.

6. The multiple-hole terminal lug of claim 1 wherein said second fasteners are a plurality of set screws.

7. The multiple-hole terminal lug of claim 1 wherein each of said at least one first fastener includes a bolt, a nut and a resilient washer therebetween.

8. The multiple-hole terminal lug of claim 1 wherein said terminal lug is made from aluminum with a conductive coating adhered thereto.

9. The multiple-hole terminal lug of claim 8 wherein said conductive coating is made of tin.

10. A bussing assembly for an electrical switching apparatus, said electrical switching apparatus including a load terminal, said bussing assembly comprising:

at least one first fastener;

a conductive terminal extension adapted to be coupled to said load terminal, said terminal extension including a number of first mounting holes; and a multiple-hole terminal lug electrically coupled to said conductive terminal extension, said multiple-hole terminal lug comprising:

a mounting portion coupled to said terminal extension in one of a plurality of predetermined mounting configurations, said mounting portion including a number of second mounting holes wherein one or more of said second mounting holes aligns with one or more of said first mounting holes of said terminal extension in order to receive said at least one first fastener therethrough, a receiving portion including a plurality of receptacles adapted to receive a corresponding plurality of electrical connection mechanisms therein; and a plurality of second fasteners structured to electrically couple said corresponding plurality of electrical connection mechanisms within said plurality of receptacles said corresponding plurality of electrical connection mechanisms being in electrical communication with said terminal extension when disposed within said plurality of receptacles.

11. The bussing assembly of claim 10 wherein said terminal extension has a longitudinal axis; wherein said plurality of predetermined mounting configurations includes first and second mounting configurations; wherein said multiple-hole terminal lug and said plurality of receptacles therein slope upward from said longitudinal axis in order to receive said corresponding plurality of electrical connection mechanisms at a first angle with respect to said longitudinal axis when disposed in said first mounting configuration; and wherein said terminal lug and said plurality of receptacles therein slope downward from said longitudinal axis in order to receive said corresponding plurality of electrical connection mechanisms at a second angle with respect to said longitudinal axis when disposed in said second mounting configuration.

12. The bussing assembly of claim 11 wherein said first mounting holes in said terminal extension include two or more primary mounting holes; wherein said second mounting holes in said mounting portion include three or more secondary mounting holes; wherein said at least one first fastener includes two or more first fasteners; and wherein at least two of said three or more secondary mounting holes in said mounting portion align with at least two of said two or more primary mounting holes in said terminal extension in order to receive said two or more first fasteners therein thereby securing said multiple-hole terminal lug in one of said first and second mounting configurations.

13. The bussing assembly of claim 12 wherein said two or more primary mounting holes in said terminal extension include first and second primary mounting holes; wherein said three or more secondary mounting holes of said mounting portion include first, second and third secondary mounting holes; wherein said two or more first fasteners include a pair of first fasteners; wherein one of said pair of first fasteners engages the first primary and secondary mounting holes of said terminal extension and said mounting portion, respectively, and the other of said pair of first fastener engages the second primary and secondary mounting holes in said terminal extension and said mounting portion respectively, when said multiple-hole terminal plug is mounted on said terminal extension in said first mounting configuration; and wherein one of said pair of said first fasteners engages the first primary and secondary mounting holes in said terminal extension and said mounting portion, respectively, and the other of said pair of first fasteners engages the second primary mounting hole in said terminal extension and the third secondary mounting hole in said mounting portion, respectively, when said multiple-hole terminal lug is mounted in said second mounting configuration.

14. The bussing assembly of claim 12 wherein said two or more primary mounting holes of said terminal extension include first, second, third and forth primary mounting holes; wherein said three or more secondary mounting holes of said mounting portion include first, second and third secondary mounting holes; wherein said two or more first fasteners securing said mounting portion include three first fasteners; wherein a first one of said three first fasteners engages the first primary and secondary mounting holes of said terminal extension and said mounting portion, respectively, a second one of said three first fasteners engages the second primary and secondary mounting holes in said terminal extension and said mounting portion, respectively, and a third one of said three first fasteners engages the fourth primary and secondary mounting holes of said terminal extension and said mounting portion, respectively, when said multiple-hole terminal lug is mounted on said terminal extension in said first mounting configuration; and wherein said first one of said three first fasteners engages the first, primary and secondary mounting holes in said terminal extension and said mounting portion, respectively, said second one of said three first fasteners engages the forth primary mounting hole in said terminal extension and the second secondary mounting hole in said mounting portion, respectively, and said third one of said three first fasteners engages the second primary mounting hole in said terminal extension and the third secondary mounting hole of said mounting portion when said multiple-hole terminal lug is mounted in said second mounting configuration.

15. The bussing assembly of claim 10 wherein said electrical connection mechanisms are electrical cables; and wherein said plurality of receptacles of said receiving portion, said electrical cables and said plurality of second fasteners are selected from the group consisting of two, three, four, five and six of each of said receptacles, said electrical cables and said second fasteners.

16. An electrical switching apparatus comprising:

separable contacts;

an operating mechanism for opening and closing said separable contacts;

a conductive load terminal;

a bussing assembly including a conductive terminal extension coupled to said load terminal, said terminal extension forming a number of first mounting holes; and a multiple-hole terminal lug electrically coupled to said terminal extension, said multiple-hole terminal lug comprising:

a mounting portion coupled to said terminal extension in one of a plurality of predetermined mounting configurations, said mounting portion forming a number of second mounting holes wherein one or more of said number of second mounting holes aligns with one or more of said number of first mounting holes of said terminal extension in order to receive at least one first fastener therethrough, a receiving portion forming a plurality of receptacles asserted to receive a corresponding plurality of electrical connection mechanisms therein; and a plurality of second fasteners structured to electrically couple said corresponding plurality of electrical connection mechanisms within said plurality of receptacles, in order that said corresponding plurality of electrical connection mechanisms are in electrical communication with said load terminal when disposed within said plurality of receptacles.

17. The electrical switching apparatus of claim 16 wherein said electrical switching apparatus is a low voltage circuit breaker including said load terminal and said conductive terminal extension coupled thereto; wherein said terminal extension has a longitudinal axis; wherein said plurality of predetermined mounting configurations includes first and second mounting configurations; wherein said multiple-hole terminal lug and said plurality of receptacles therein slope upward from said longitudinal axis in order to receive said corresponding plurality of electrical connection mechanisms at a first angle with respect to said longitudinal axis when said multiple-hole terminal lug is disposed in said first mounting configuration; and wherein said terminal lug and said plurality of receptacles therein slope downward from said longitudinal axis in order to receive said corresponding plurality of electrical connection mechanisms at a second angle with respect to said longitudinal axis when said multiple-hole terminal lug is disposed in said second mounting configuration.

18. The electrical switching apparatus of claim 17 wherein said first mounting holes in said terminal extension include two or more primary mounting holes; wherein said second mounting holes in said mounting portion include three or more secondary mounting holes; wherein said at least one first fastener includes two or more first fasteners; and wherein at least two of said three or more secondary mounting holes in said mounting portion align with said at least two of said two or more primary mounting holes in said terminal extension in order to receive said two or more first fasteners therein, thereby securing said multiple-hole terminal lug in one of said first and second mounting configurations.

19. The electrical switching apparatus of claim 18 wherein said two or more primary mounting holes include first and second primary mounting holes; wherein said three or more secondary mounting holes of said mounting portion include first, second and third secondary mounting holes; wherein said at least one first fastener includes a pair of first fasteners; wherein one of said pair of first fasteners engages the first primary and secondary mounting holes in said terminal extension and said mounting portion, respectively, and the other of said pair of first fasteners engages the secondary primary and secondary mounting holes in said terminal extension and said mounting portion, respectively, when said multiple-hole terminal lug is mounted on said terminal extension in said first mounting configuration; and wherein said one of said pair of first fasteners engages the first primary and secondary mounting holes in said terminal extension and said mounting portion, respectively, and said other of said pair of first fasteners engages the second primary mounting hole in said terminal extension and the third secondary mounting hole in said mounting portion, respectively, when said multiple-hole terminal lug is mounted in said second mounting configuration.

20. The electrical switching apparatus of claim 18 wherein said two or more primary first mounting holes of said terminal extension include first, second, third and forth primary mounting holes; wherein said three or more secondary mounting holes of said mounting portion includes first, second and third secondary mounting holes; wherein said two or more first fasteners securing said mounting portion includes three first fasteners; wherein a first one of said three first fasteners engages the first primary and secondary mounting holes of said terminal extension and said mounting portion, respectively, a second one of said three first fasteners engages the second primary and secondary mounting holes in said terminal extension and said mounting portion, respectively, and a third one of said three first fasteners engages the third primary and secondary mounting holes of said terminal extension and said mounting portion, respectively, when said multiple-hole terminal lug is mounted on said terminal extension in said first mounting configuration; and wherein said first one of said three first fasteners engages the first, primary and secondary mounting holes in said terminal extension and said mounting portion, respectively, said second one of said three first fasteners engages the fourth primary mounting hole in said terminal extension and the second secondary mounting hole in said mounting portion, respectively, and said third one of said three first fasteners engages the second primary mounting hole in said terminal extension and the third secondary mounting hole of said mounting portion when said multiple-hole terminal lug is mounted in said second mounting configuration.

* * * * *